US006682575B2

(12) United States Patent
Vacassy

(10) Patent No.: US 6,682,575 B2
(45) Date of Patent: Jan. 27, 2004

(54) METHANOL-CONTAINING SILICA-BASED CMP COMPOSITIONS

(75) Inventor: Robert Vacassy, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 10/092,406

(22) Filed: Mar. 5, 2002

(65) Prior Publication Data

US 2003/0168628 A1 Sep. 11, 2003

(51) Int. Cl.[7] .............................. C09G 1/02; C09G 1/04; B24B 1/00
(52) U.S. Cl. ............................ 51/308; 106/3; 438/692; 438/693; 216/89; 216/99
(58) Field of Search ............................... 51/308; 106/3; 438/692, 693; 216/89, 99

(56) References Cited

U.S. PATENT DOCUMENTS

| | | |
|---|---|---|
| 5,391,258 A | 2/1995 | Brancaleoni et al. |
| 5,476,606 A | 12/1995 | Brancaleoni et al. |
| 5,489,233 A | 2/1996 | Cook et al. |
| 5,527,423 A | 6/1996 | Neville et al. |
| 5,614,444 A | 3/1997 | Farkas et al. |
| 5,733,819 A | 3/1998 | Kodama et al. |
| 5,738,800 A | 4/1998 | Hosali et al. |
| 5,770,103 A | 6/1998 | Wang et al. |
| 5,895,509 A | 4/1999 | Ohmi et al. |
| 5,904,159 A * | 5/1999 | Kato et al. ...................... 134/7 |
| 5,954,997 A * | 9/1999 | Kaufman et al. ........... 252/79.1 |
| 5,958,794 A | 9/1999 | Bruxvoort et al. |
| 6,062,968 A | 5/2000 | Sevilla et al. |
| 6,117,000 A | 9/2000 | Anjur et al. |
| 6,126,532 A | 10/2000 | Sevilla et al. |
| 6,190,237 B1 | 2/2001 | Huynh et al. |
| 6,322,600 B1 | 11/2001 | Brewer et al. |
| 6,383,240 B1 * | 5/2002 | Nishimoto et al. ............ 51/307 |
| 6,527,818 B2 * | 3/2003 | Hattori et al. ................. 51/308 |
| 2001/0013506 A1 | 8/2001 | Chamberlin et al. |

FOREIGN PATENT DOCUMENTS

| | | |
|---|---|---|
| EP | 1 150 341 A1 | 10/2001 |
| JP | 11-116942 A | 4/1999 |
| JP | 2000-230169 A | 8/2000 |
| WO | WO 01/52618 | 7/2001 |
| WO | WO 01/84613 A1 | 11/2001 |

OTHER PUBLICATIONS

US 6,331,134, 12/2001, Sachan et al. (withdrawn).
Dahlin, L.M., Precision Metal, vol. 27, No. 1, pp. 81–83 (Jan. 1969).
Li, Yang et al., "Chemical Mechanisms in CMP of Cu and Ta using Silica Abrasives," Conference of the 5th International Symposium on Chemical–Mechanical Polishing, Lake Placid, NY (Aug. 13–16, 2000).

\* cited by examiner

Primary Examiner—Michael Marcheschi

(57) ABSTRACT

The invention provides a polishing composition comprising (a) a silica abrasive, (b) methanol, and (c) a liquid carrier, wherein the polishing composition has a pH of about 1 to about 6, and the polishing composition is colloidally stable. The invention also provides a method for polishing a substrate comprising a silicon-based dielectric layer using the polishing composition. The invention further provides a method of stabilizing a silica abrasive in a polishing composition by contacting the abrasive with methanol.

15 Claims, No Drawings

METHANOL-CONTAINING SILICA-BASED CMP COMPOSITIONS

FIELD OF THE INVENTION

This invention pertains to CMP polishing compositions comprising silica abrasive, as well as methods of polishing substrates with such polishing compositions.

BACKGROUND OF THE INVENTION

Compositions and methods for planarizing or polishing the surface of a substrate are well known in the art. Polishing compositions (also known as polishing slurries) typically contain an abrasive material in an aqueous solution and are applied to a surface by contacting the surface with a polishing pad saturated with the polishing composition. Typical abrasive materials include silicon dioxide, cerium oxide, aluminum oxide, zirconium oxide, and tin oxide. U.S. Pat. No. 5,527,423, for example, describes a method for chemically-mechanically polishing a metal layer by contacting the surface with a polishing slurry comprising high purity fine metal oxide particles in an aqueous medium. The polishing slurry is typically used in conjunction with a polishing pad (e.g., polishing cloth or disk). Suitable polishing pads are described in U.S. Pat. Nos. 6,062,968, 6,117,000, and 6,126,532 which disclose the use of sintered polyurethane polishing pads having an open-celled porous network and U.S. Pat. No. 5,489,233 which discloses the use of solid polishing pads having a surface texture or pattern. Alternatively, the abrasive material may be incorporated into the polishing pad. U.S. Pat. No. 5,958,794 discloses a fixed abrasive polishing pad.

Conventional polishing systems and polishing methods typically are not entirely satisfactory at planarizing semiconductor wafers. In particular, polishing compositions and polishing pads can have less than desirable polishing rates or polishing selectivities, and their use in chemically-mechanically polishing semiconductor surfaces can result in poor surface quality. Because the performance of a semiconductor wafer is directly associated with the planarity of its surface, it is crucial to use a polishing composition and method that results in a high polishing efficiency, selectivity, uniformity, and removal rate and leaves a high quality polish with minimal surface defects.

The difficulty in creating an effective polishing system for semiconductor wafers stems from the complexity of the semiconductor wafer. Semiconductor wafers are typically composed of a substrate, on which a plurality of transistors has been formed. Integrated circuits are chemically and physically connected into a substrate by patterning regions in the substrate and layers on the substrate. To produce an operable semiconductor wafer and to maximize the yield, performance, and reliability of the wafer, it is desirable to polish select surfaces of the wafer without adversely affecting underlying structures or topography. In fact, various problems in semiconductor fabrication can occur if the process steps are not performed on wafer surfaces that are adequately planarized.

The use of alcohols in polishing compositions is well known in the art. For example, U.S. Pat. Nos. 5,391,258 and 5,476,606 disclose a polishing composition comprising an abrasive and an anion containing two acid groups (e.g., hydroxyl groups), which purportedly controls the rate of removal of silica. U.S. Pat. No. 5,614,444 discloses polishing compositions comprising polishing additives having a polar component (e.g., an alcohol) and a non-polar component (e.g., an alkyl group). The polishing additive is used to suppress the removal rate of a dielectric material. U.S. Pat. No. 5,733,819 discloses a polishing composition comprising silicon nitride abrasive, water, acid, and optionally a water-soluble alcohol additive (e.g., ethanol, propanol, ethylene glycol). U.S. Pat. No. 5,738,800 discloses an aqueous polishing composition comprising abrasive, a surfactant, and a complexing agent comprising two functional groups (e.g., hydroxyl groups), which purportedly complexes silica and silicon nitride layers. U.S. Pat. No. 5,770,103 discloses a polishing composition comprising mono-, di-, or tri-substituted phenol compounds, which purportedly increase the removal rates of titanium substrate layers. U.S. Pat. No. 5,895,509 discloses a polishing composition comprising an abrasive, isopropyl alcohol, and water. U.S. patent application Ser. No. 2001/0013506 discloses a polishing composition comprising abrasive particles, an oxidizer, a pH of about 5 to about 11, and optionally an organic diluent (e.g., methanol, ethanol, ethylene glycol, or glycerol). EP 1 150 341 A1 discloses the use of alcohols as dissolution promoters in polishing compositions comprising a film-forming agent. JP 11116942 discloses a polishing composition comprising silica, water, a water-soluble polymeric compound, a base, and a compound having 1–10 alcoholic hydroxyl groups. JP 2000230169 discloses an aqueous polishing composition comprising silica, a pH buffer, and a water-soluble polishing accelerator (e.g., an alcohol), which purportedly improves polishing rates. WO 98/48453 discloses a polishing composition comprising spherical silica, an amine hydroxide, and an alkaline liquid carrier comprising up to about 9% alcohol, which purportedly increases polishing rates. WO 01/84613 discloses the use of a fixed abrasive article and an aqueous polishing composition comprising a polar component (e.g., methanol, ethanol, etc.), which purportedly reduces the surface tension of the polishing composition and provides better wetting of the surface of hydrophobic substrates.

There remains a need, however, for alternative polishing compositions, which exhibit satisfactory polishing characteristics, such as good removal rates and low surface defects. The invention seeks to provide such a polishing composition and method. These and other advantages of the invention will be apparent from the description of the invention provided herein.

BRIEF SUMMARY OF THE INVENTION

The invention provides a polishing composition comprising (a) a silica abrasive, (b) methanol, and (c) a liquid carrier, wherein the polishing composition has a pH of about 1 to about 6 and the interaction between the silica abrasive and the methanol provides colloidal stability to the polishing composition. The invention also provides a method for polishing a substrate comprising a silicon-based dielectric layer using the polishing composition. The invention further provides a method of stabilizing silica abrasive by contacting the abrasive with methanol.

DETAILED DESCRIPTION OF THE INVENTION

The invention is directed to a polishing composition comprising silica abrasive, methanol, and a liquid carrier. The polishing composition has a pH of about 1 to about 6. The interaction between the silica abrasive and the methanol provides colloidal stability to the polishing composition.

The silica abrasive typically is selected from the group consisting of fumed silica, colloidal silica, silica-coated abrasive particles, silica-containing co-formed particles (e.g., aluminosilicates), and combinations thereof. Silica-coated abrasive particles can include silica-coated alumina or silica-coated polymer particles. The silica-containing co-formed particles typically contain about 10 wt. % or more silicon. Any suitable amount of silica can be present in the polishing composition. The polishing composition typically comprises silica abrasive in an amount of about 0.1 wt. % or more (e.g., about 0.5 wt. % or more). The polishing composition typically also comprises silica abrasive in an amount of about 5 wt. % or less (e.g., about 2 wt. % or less or about 1 wt. % or less).

The interaction of the silica abrasive with the methanol under acidic conditions results in a polishing composition that is colloidally stable. Colloidal stability refers to the maintenance of the suspension of abrasive particles over time. In the context of this invention, the polishing composition is considered colloidally stable if, when 100 ml of the polishing composition placed in a 100 ml graduated cylinder and allowed to stand unagitated for a time of 2 hours, the difference between the concentration of particles in the bottom 50 ml of the graduated cylinder ([B] in terms of, for example, g/ml) and the concentration of particles in the top 50 ml of the graduated cylinder ([T] in terms of, for example, g/ml) divided by the initial concentration of particles in the abrasive composition ([C] in terms of, for example, g/ml) is less than or equal to 0.5 (i.e., $\{[B]-[T]\}/[C] \leq 0.5$). The value of $[B]-[T]/[C]$ desirably is less than or equal to 0.3, and preferably is less than or equal to 0.1.

The silica abrasive typically has an average particle size of about 500 nm or less, e.g., about 10 nm to about 500 nm. Preferably, the silica abrasive has an average particle size of about 250 nm or less, e.g., about 10 nm to about 250 nm. More preferably, the silica abrasive has an average particle size of about 150 nm or less, e.g., about 10 nm to about 150 nm or about 10 nm to about 120 nm.

Any suitable amount of methanol can be present in the polishing composition. The amount of methanol relative to the amount of silica abrasive should be sufficient to produce a polishing composition that is colloidally stable. Methanol typically is present in the polishing composition in an amount of about 100 ppm or more (e.g., about 200 ppm or more). Methanol typically also is present in the polishing composition in an amount of about 10,000 ppm or less (e.g., about 6000 ppm or less, about 4000 ppm or less, or about 2000 ppm or less). Preferably, the polishing composition comprises about 100 ppm to about 1000 ppm of methanol. More preferably, the polishing composition comprises about 100 ppm to about 800 ppm of methanol. The amount of methanol present in the polishing composition can be related to the amount of silica abrasive. For example, the polishing composition can comprise about 200 ppm to about 4000 ppm (e.g., about 200 ppm to about 2000 ppm, or about 200 ppm to about 1600 ppm) of methanol per wt. % of silica abrasive.

The polishing composition has an acidic pH of about 1 to about 6. Preferably, the polishing composition has a pH of about 1.5 to about 5 (e.g., about 1.5 to about 4). The polishing composition optionally further comprises pH adjusting agents, for example, potassium or ammonium hydroxide, mineral acids, or organic acids.

Silica abrasives are very stable at higher pH (e.g., above pH of 6). However, at acidic pH (e.g., below pH of 6), the silica particles have a lower surface charge suggesting that hydroxyl groups present on the silica particle are protonated. Under acidic conditions, the silica particles are more likely to collide, resulting in irreversible formation of siloxane bonds and aggregation. Treating the silica abrasive with a small amount of methanol results in stabilization (e.g., reduced aggregation) of the silica abrasives at low pH. Methanol reacts with the surface silanol groups under acidic conditions. Colloidal silica particles have more surface hydroxyl groups than fumed silica and thus are more difficult to stabilize at acidic pH.

A liquid carrier is used to facilitate the application of the silica abrasive, methanol, and any optional additives to the surface of a suitable substrate to be polished (e.g., planarized). The liquid carrier is typically an aqueous carrier and can be water alone, can comprise water and a suitable water-miscible solvent, or can be an emulsion. Preferably, the aqueous carrier consists of water, more preferably deionized water.

The polishing composition optionally further comprises an oxidizing agent. The oxidizing agent can be any suitable oxidizing agent. Suitable oxidizing agents include inorganic and organic per-compounds, bromates, nitrates, chlorates, chromates, iodates, iron and copper salts (e.g., nitrates, sulfates, EDTA, and citrates), rare earth and transition metal oxides (e.g., osmium tetraoxide), potassium ferricyanide, potassium dichromate, iodic acid, and the like. A per-compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates ($SO_5^{2-}$), dipersulfates ($S_2O_8^{2-}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. The oxidizing agent preferably is hydrogen peroxide.

The polishing composition optionally further comprises a chelating or complexing agent. The complexing agent is any suitable chemical additive that enhances the removal rate of the substrate layer being removed. Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), polyacrylates, mixtures thereof, and the like), carboxylates containing one or more sulfonic and/or phosphonic groups, and the like. Suitable chelating or complexing agents also can include, for example, di-, tri-, or polyalcohols (e.g., ethylene glycol, pyrocatechol, pyrogallol, tannic acid, and the like) and amine-containing compounds (e.g., ammonia, amino acids, amino alcohols, di-, tri-, and polyamines, and the like). Preferably, the complexing agent is a carboxylate salt, more preferably an oxalate salt. The choice of chelating or complexing agent will depend on the type of substrate layer being removed.

It will be appreciated that many of the aforementioned compounds can exist in the form of a salt (e.g., a metal salt, an ammonium salt, or the like), an acid, or as a partial salt. For example, citrates include citric acid, as well as mono-, di-, and tri-salts thereof; phthalates include phthalic acid, as well as mono-salts (e.g., potassium hydrogen phthalate) and di-salts thereof, perchlorates include the corresponding acid (i.e., perchloric acid), as well as salts thereof. Furthermore, certain compounds or reagents may perform more than one function. For example, some compounds can function both as a chelating agent and an oxidizing agent (e.g., certain ferric nitrates and the like).

The polishing composition can be prepared in any suitable manner. In general, the polishing composition described herein will be prepared, and a polishing composition comprising a silica abrasive and a liquid carrier will be stabilized by (i) providing silica abrasive, (ii) providing a liquid carrier for the silica abrasive, and (iii) contacting the silica abrasive with methanol to form a stabilized polishing composition, desirably at a pH of about 1 to about 6. The methanol can contact (and interact with) the silica abrasive at any suitable point in the preparation (or stabilization) of the polishing composition. Thus, for example, the methanol can be added to a polishing composition comprising silica abrasive and a liquid carrier. Alternatively or in addition, the methanol can contact the silica abrasive before the silica abrasive is added to a liquid carrier.

The polishing composition described herein can be used to polish (e.g., planarize) a substrate. The method of polishing a substrate comprises (i) providing the polishing composition, (ii) contacting the substrate with the polishing composition, and (iii) abrading at least a portion of the substrate with the polishing composition to polish the substrate. The polishing composition desirably is used in a method of polishing a substrate comprising at least one dielectric layer, whereby the substrate is contacted with the polishing composition and at least a portion of the dielectric layer of the substrate is abraded such that the dielectric layer becomes polished. The substrate can be any suitable substrate (e.g., an integrated circuit, memory or rigid disks, metals, ILD layers, semiconductors, micro-electromechanical systems, ferroelectrics, magnetic heads, polymeric films, and low and high dielectric constant films) and can contain any suitable dielectric layer (e.g., insulating layer). Typically the dielectric layer is a silicon-based material, for example, silicon dioxide. The dielectric layer also can be a porous metal oxide, glass, organic polymer, fluorinated organic polymer, or any other suitable high or low-κ dielectric layer. The dielectric layer preferably comprises silicon oxide, silicon nitride, silicon oxynitride, silicon carbide, aluminum oxide, or a material with a dielectric constant of about 3.5 or less. The substrate typically further comprises one or more layers comprising a metal or a polishing stop layer (e.g., silicon nitride). For example, the metal can be tungsten, copper, aluminum, or nickel. Preferably, the metal is tungsten or copper. The polishing composition can provide good polishing efficiency, selectivity, uniformity and/or removal rates as well as reduced erosion of the substrate surface and fewer surface defects as compared to many conventional polishing compositions.

The following examples further illustrate the invention but, of course, should not be construed as in any way limiting its scope.

EXAMPLE 1

This example illustrates that silica particles treated with methanol are colloidally stable at acidic pH.

Polishing compositions containing water and 1.72 wt. % colloidal silica abrasive (Akzo Nobel Bindzil 50/80™ silica) at a pH of 2.3 were allowed to stand over two weeks in a 100 ml test tube. Polishing Composition 1A (control) contained no additive. Polishing Compositions 1B and 1C (invention) contained 150 and 750 ppm methanol, respectively. Polishing Compositions 1D and 1E (control) contained 150 and 750 ppm ethanol, respectively. Polishing Compositions 1F and 1G contained 150 and 750 ppm trimethylammonium hydroxide, respectively. Polishing Compositions 1H and 1I contained 150 and 750 ppm ammonia, respectively. Polishing Compositions 1J and 1K contained 150 and 750 ppm aluminum nitrate, respectively. At the end of two weeks, the volume of settled abrasive particles (in ml) and the volume of clear solution at the top of the 100 ml test tube (in ml) were recorded for each of the polishing compositions. The total volume of silica abrasive in the polishing composition was 7 ml. In examples where the volume of sedimentation is greater than 7 ml, the particle volume is inflated due to repulsion between adsorbed additive molecules. The results are summarized in Table 1.

TABLE 1

| Polishing Composition | Additive | Volume Sedimentation | Clear Solution on Top |
|---|---|---|---|
| 1A | none | 6.5 | 93.5 |
| 1B | 150 ppm MeOH | 2 | 6 |
| 1C | 750 ppm MeOH | 0 | 3 |
| 1D | 150 ppm EtOH | 2.5 | 8 |
| 1E | 750 ppm EtOH | 2.5 | 8 |
| 1F | 150 ppm [Me$_3$NH]OH | 9 | 50 |
| 1G | 750 ppm [Me$_3$NH]OH | 13 | 87 |
| 1H | 150 ppm ammonia | 5.5 | 12 |
| 1I | 750 ppm ammonia | 4 | 10 |
| 1J | 150 ppm Al(NO$_3$)$_3$ | 13 | 87 |
| 1K | 750 ppm Al(NO$_3$)$_3$ | 6.5 | 93.5 |

The results set forth in Table 1 demonstrate that silica abrasive-based polishing compositions containing methanol (Polishing Compositions 1B and 1C) exhibit colloidal stability under acidic conditions. Similar silica abrasive-based polishing compositions not containing methanol (Polishing Compositions 1A and 1D-1K), e.g., containing no additive or containing ethanol, trimethylammonium hydroxide, ammonia, or aluminum nitrate, exhibit less colloidal stability, as evidenced by the greater volume of sedimentation.

EXAMPLE 2

This example illustrates that silica particles treated with methanol are colloidally stable at acidic pH.

Polishing compositions containing water and 1.72 wt. % colloidal silica abrasive (Akzo Nobel Bindzil 50/80™ silica) at a pH of 2.3 were allowed to stand over one week in a 100 ml test tube. Polishing Composition 2A (control) contained no alcohol additive. Polishing Compositions 2B-2H (invention) contained 50, 100, 250, 500, 750, 1500, and 2500 ppm methanol, respectively. At the end of one week, the volume of settled abrasive particles (in ml) and the volume of clear solution at the top of the 100 ml test tube (in ml) were recorded for each of the polishing compositions. The total volume of silica abrasive in the polishing composition was 7 ml. The results are summarized in Table 2.

TABLE 2

| Polishing Composition | Methanol (ppm) | Volume Sedimentation | Clear Solution on Top |
|---|---|---|---|
| 2A | 0 | 6.5 | 93.5 |
| 2B | 50 | 1 | 7 |
| 2C | 100 | 0 | 3 |
| 2D | 250 | 0 | 3 |
| 2E | 500 | 0 | 3 |
| 2F | 750 | 0 | 3 |
| 2G | 1500 | 0 | 3 |
| 2H | 2500 | 1 | 3 |

The results set forth in Table 2 demonstrate that silica abrasive-based polishing compositions containing methanol (Polishing Compositions 2B-2H) exhibit colloidal stability under acidic conditions unlike a similar silica abrasive-based polishing composition not containing methanol (Polishing Composition 2A).

EXAMPLE 3

This example illustrates that polishing compositions containing silica abrasive and methanol have a lower occurrence of erosion.

Similar patterned wafers containing tungsten and oxide layers were polished under similar conditions using different polishing compositions (Polishing Compositions 3A-3C). Polishing Compositions 3A-3C each contained water, 1.5 wt. % fumed silica, and 4 wt. % $H_2O_2$. Polishing Composition 3A (control) contained no methanol. Polishing Compositions 3B and 3C (invention) contained 250 and 750 ppm methanol, respectively. Each of the polishing compositions was used to polish tungsten pattern wafers. The time to clear the tungsten pattern feature as well as the oxide erosion in regions of 50% line density (0.35 micron line with 0.35 micron spacing), 72% line density (0.9 micron line with 0.35 micron spacing), and 83% line density (2.5 micron line with 0.5 micron spacing) were measured for each of the polishing compositions. The results are summarized in Table 3.

TABLE 3

| Polishing Composition | Methanol (ppm) | Time to Clear (s) | 50% Erosion (Å) | 72% Erosion (Å) | 83% Erosion (Å) |
|---|---|---|---|---|---|
| 3A | 0 | 141 | 538 | 464 | 1770 |
| 3B | 250 | 119 | 305 | 282 | 1550 |
| 3C | 750 | 136 | 431 | 383 | 1704 |

The results set forth in Table 3 show that polishing compositions containing silica abrasive and methanol at acidic pH have a faster time to clear and produce less erosion than similar polishing compositions without methanol.

EXAMPLE 4

This example illustrates that polishing compositions containing silica abrasive and methanol have a lower occurrence of erosion.

Similar patterned wafers containing tungsten and oxide layers were polished under similar conditions using different polishing compositions (Polishing Compositions 4A-4D). Polishing Compositions 4A and 4B contained water, 1.5 wt. % fumed silica, and 4 wt. % $H_2O_2$. Polishing Compositions 4C and 4D contained water, 0.5 wt. % fumed silica, and 4 wt. % $H_2O_2$. Polishing Compositions 4A and 4C (control) contained no methanol. Polishing Compositions 4B and 4D (invention) contained 600 ppm methanol. Each of the polishing compositions was used to polish tungsten wafers. The amount of oxide erosion (in Å) that occurred during substrate polishing using each of the polishing compositions was determined for three regions of the substrate including regions of 50% line density (0.35 micron line with 0.35 micron spacing), 72% line density (0.9 micron line with 0.35 micron spacing), and 83% line density (2.5 micron line with 0.5 micron spacing). The polishing results are summarized in Table 4.

TABLE 4

| Polishing Composition | Methanol (ppm) | 50% Erosion (Å) | 72% Erosion (Å) | 83% Erosion (Å) |
|---|---|---|---|---|
| 4A | 0 | 570 | 505 | 1695 |
| 4B | 600 | 376 | 372 | 1796 |
| 4C | 0 | 498 | 453 | 1251 |
| 4D | 600 | 404 | 231 | 1186 |

The results set forth in Table 4 show that polishing compositions containing silica abrasive and methanol at acidic pH produce less erosion than similar polishing compositions without methanol.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A polishing composition comprising:
   (a) silica abrasive,
   (b) methanol in an amount of from about 100 ppm to about 2000 ppm, and
   (c) a liquid carrier,
   wherein the polishing composition has a pH of about 1 to about 6 and the interaction between the silica abrasive and the methanol provides colloidal stability to the polishing composition.

2. The polishing composition of claim 1, wherein the silica abrasive is selected from the group consisting of fumed silica, colloidal silica, silica-coated abrasive particles, and combinations thereof.

3. The polishing composition of claim 1, wherein the polishing composition has, a pH of about 1.5 to about 4.

4. The polishing composition of claim 1, wherein the liquid carrier comprises water.

5. The polishing composition of claim 1, wherein the methanol is present in an amount of about 100 ppm to about 1500 ppm.

6. The polishing composition of claim 5, wherein the methanol is present in an amount of about 100 ppm to about 800 ppm.

7. The polishing composition of claim 1, wherein the silica abrasive is present in an amount of about 0.5 wt. % to about 5 wt. %.

8. The polishing composition of claim 7, wherein about 200 ppm to about 2000 ppm of methanol is present per wt. % of silica abrasive.

9. The polishing composition of claim 8, wherein about 200 ppm to about 1600 ppm of methanol is present per wt. % of silica abrasive.

10. The polishing composition of claim 1, wherein the composition further comprises an oxidizer.

11. The polishing composition of claim 1, wherein the composition further comprises a complexing agent.

12. A method of polishing a substrate comprising (i) contacting a substrate comprising a silicon-based layer with the polishing composition of claim 1, and (ii) abrading at least a portion of the substrate with the polishing composition to polish the substrate.

13. The method of claim 12, wherein the substrate further comprises a tungsten, copper, or nickel layer.

14. The method of claim 12, wherein the silicon-based layer is silicon dioxide and the substrate further comprises a silicon nitride layer.

15. A method of stabilizing a polishing composition comprising a silica abrasive and a liquid carrier comprising (i) providing silica abrasive, (ii) providing a liquid carrier for the silica abrasive, and (iii) contacting the silica abrasive with methanol to form a stabilized polishing composition, wherein the methanol is present in the polishing composition in an amount of from about 100 ppm to about 2000 ppm, and wherein the polishing composition has a pH of about 1 to about 6.

* * * * *